(12) United States Patent
Watanabe et al.

(10) Patent No.: US 12,742,494 B2
(45) Date of Patent: Sep. 22, 2026

(54) VEHICLE DRIVE DEVICE

(71) Applicant: AISIN CORPORATION, Kariya (JP)

(72) Inventors: Takuya Watanabe, Kariya (JP); Ryohei Takahashi, Kariya (JP); Keisuke Takemoto, Kariya (JP); Takuya Katsuda, Kariya (JP); Kazuhiro Hagita, Kariya (JP); Hidefumi Koashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 231 days.

(21) Appl. No.: 18/777,754

(22) Filed: Jul. 19, 2024

(65) Prior Publication Data

US 2025/0075788 A1 Mar. 6, 2025

(30) Foreign Application Priority Data

Aug. 31, 2023 (JP) ................................ 2023-141813

(51) Int. Cl.
*B60K 1/00* (2006.01)
*B60K 17/04* (2006.01)
(Continued)

(52) U.S. Cl.
CPC ............... *F16H 57/02* (2013.01); *B60K 1/00* (2013.01); *B60K 17/04* (2013.01); *B60L 53/22* (2019.02);
(Continued)

(58) Field of Classification Search
CPC . B60K 1/00; B60K 1/04; B60K 17/04; B60K 17/12; B60K 2001/001; B60L 53/22; F16H 57/02; F16H 2057/02034; F16H 2057/02052; H02K 5/04; H02K 5/7006; H02K 5/116; H02K 11/33
See application file for complete search history.

(56) References Cited

U.S. PATENT DOCUMENTS

2018/0262089 A1 9/2018 Hatch
2021/0086635 A1 3/2021 Ueda
(Continued)

FOREIGN PATENT DOCUMENTS

JP 2021-048748 A 3/2021
WO 2023/095752 A1 6/2023

OTHER PUBLICATIONS

Feb. 24, 2025 extended Search Report issued in European Patent Application No. 24191486.0.

*Primary Examiner* — Tinh T Dang
(74) *Attorney, Agent, or Firm* — Oliff PLC

(57) ABSTRACT

An offset gear mechanism in a power transmission mechanism is arranged on a different axis in an axis-orthogonal direction from an axis on which a rotary electric machine and an output member are arranged. The rotary electric machine and the power transmission mechanism are arranged in a first housing chamber, and an inverter module and a power source module are arranged in a second housing chamber. The second housing chamber includes an upper area on an upper side overlapping the rotary electric machine, and a lateral area on the axis-orthogonal direction first side overlapping the offset gear mechanism. At least a part of the inverter module is arranged in the upper area, and at least a part of the power source module is arranged in the lateral area.

6 Claims, 7 Drawing Sheets

(51) Int. Cl.
*B60L 53/22* (2019.01)
*F16H 57/02* (2012.01)
*H02K 5/04* (2006.01)
*H02K 7/00* (2006.01)
*H02K 7/116* (2006.01)
*H02K 11/33* (2016.01)

(52) U.S. Cl.
CPC ............... *H02K 5/04* (2013.01); *H02K 7/006* (2013.01); *H02K 7/116* (2013.01); *H02K 11/33* (2016.01); *B60K 2001/001* (2013.01); *F16H 2057/02034* (2013.01); *F16H 2057/02052* (2013.01)

(56) References Cited

U.S. PATENT DOCUMENTS

| | | | | |
|---|---|---|---|---|
| 2021/0316602 | A1* | 10/2021 | Suzuki | H02K 5/04 |
| 2022/0158523 | A1* | 5/2022 | Ishikawa | F16H 57/0476 |
| 2022/0281301 | A1* | 9/2022 | Nagaya | H02K 7/116 |

* cited by examiner 1
92
A1
A2
DS
3
4
9
PE
7
Z
Z1
Z2
Y
Y1
Y2
E1
E2
E3
E4
E5
E6
2
75
61
50
5
91
L
L1
L2
8
93
94

1
L
L2
L1
9
2
PE
61
Y1
Y
Y2
50
5
7
75

Z1
Z
Z2
L1
L
L2
Y1
Y
Y2
E3
E4
E5
E4,E5
E6
PE
7T
1
3
4
8
9

VEHICLE DRIVE DEVICE

CROSS REFERENCE TO RELATED APPLICATIONS

This application is based on and claims priority under 35 U.S.C. § 119 to Japanese Patent Application 2023-141813, filed on Aug. 31, 2023, the entire content of which is incorporated herein by reference.

TECHNICAL FIELD

This disclosure generally relates to a vehicle drive device.

BACKGROUND DISCUSSION

In JP2021-48748A, a vehicle drive device that houses, in a case (13), a rotary electric machine (11A) that serves as a driving force source of wheels, a transmission (12) that transmits motive power from the rotary electric machine (11A) to an output shaft (15), a power module (25) that drives the rotary electric machine (11A) upon receiving supply of high-voltage DC power from a battery, an ECU (26) that controls the power module (25), and a voltage converter (29) that steps down the high-voltage DC power supplied from the battery and supplies the ECU (26) with low-voltage DC power is disclosed (reference signs in parentheses in the background discussion are reference signs provided in the cited document). The power module (25) and the ECU (26) constitute a power drive unit (28) in conjunction with a capacitor module (27) that smooths DC power from the battery.

A rotation shaft (14) of the rotary electric machine (11A) and the output shaft (15) are different shafts that are parallel with each other. Therefore, it is interpreted that a gear for transmitting motive power between the rotation shaft (14) and the output shaft (15) is arranged on an axis that is parallel with and different from the rotation shaft (14) and the output shaft (15). Alternatively, it is interpreted that motive power is transmitted between the rotation shaft (14) and the output shaft (15) by a belt, a chain, or the like. In addition, the power drive unit (28) is housed in a first housing chamber (21) in the case (13), and the voltage converter (29) is housed in a second housing chamber (22) in the case (13). The first housing chamber (21) is disposed on an upper side of the rotary electric machine (11A), and the second housing chamber (22) is disposed on a lateral side of the first housing chamber (21).

When the first housing chamber (21) and the second housing chamber (22) are separated from each other as described above, it is required to secure a housing space in the first housing chamber (21) according to a size of the power drive unit (28) and also secure a housing space in the second housing chamber (22) according to a size of the voltage converter (29), and thus miniaturization of the case (13), that is, miniaturization of the vehicle drive device, is restricted. Conversely, when the power drive unit (28) is formed according to the housing space in the first housing chamber (21) and the voltage converter (29) is formed according to the housing space in the second housing chamber (22), there are cases where performance required for a circuit becomes difficult to secure or it becomes necessary to form the circuit by using expensive components for miniaturization. Specifically, when the first housing chamber (21) and the second housing chamber (22) are separated from each other, flexibility for arrangement and configuration of the power drive unit (28) and the voltage converter (29) tends to deteriorate.

A need thus exists for a vehicle drive device, which is not susceptible to the drawback mentioned above.

SUMMARY

In view of the foregoing, a vehicle drive device includes: a rotary electric machine including a rotor; an output member being drivingly connected to a wheel; a power transmission mechanism that transmits driving force between the rotary electric machine and the output member; an inverter module for drive-controlling the rotary electric machine; a power source module that is electrically connected to an in-vehicle battery and includes at least one of a voltage conversion circuit that performs conversion of voltage of the in-vehicle battery, a charging circuit for performing charging from an external power source to the in-vehicle battery, and a power supply circuit for performing power supply from the in-vehicle battery to an outside; and a case including a first housing chamber that houses the rotary electric machine and the power transmission mechanism, and a second housing chamber that houses the inverter module and the power source module, and when a direction along a rotor axis being a rotational axis of the rotor is defined as an axial direction, a direction orthogonal to the rotor axis in an up-down direction view is defined as an axis-orthogonal direction, and one side in the axis-orthogonal direction is defined as an axis-orthogonal direction first side, an output axis being a rotational axis of the output member is arranged coaxially with the rotor axis, the power transmission mechanism includes an offset gear mechanism being arranged on an offset axis being located on the axis-orthogonal direction first side with respect to the rotor axis and the output axis, the second housing chamber includes, while the vehicle drive device is in an in-vehicle state of being mounted on a vehicle, an upper area being an area being located on an upper side with respect to the rotary electric machine and overlapping the rotary electric machine in an up-down direction view, and a lateral area being an area being located on the axis-orthogonal direction first side with respect to the rotary electric machine, not overlapping the rotary electric machine in an up-down direction view, and overlapping the offset gear mechanism in an axial direction view, at least a part of the inverter module is arranged in the upper area, and at least a part of the power source module is arranged in the lateral area.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
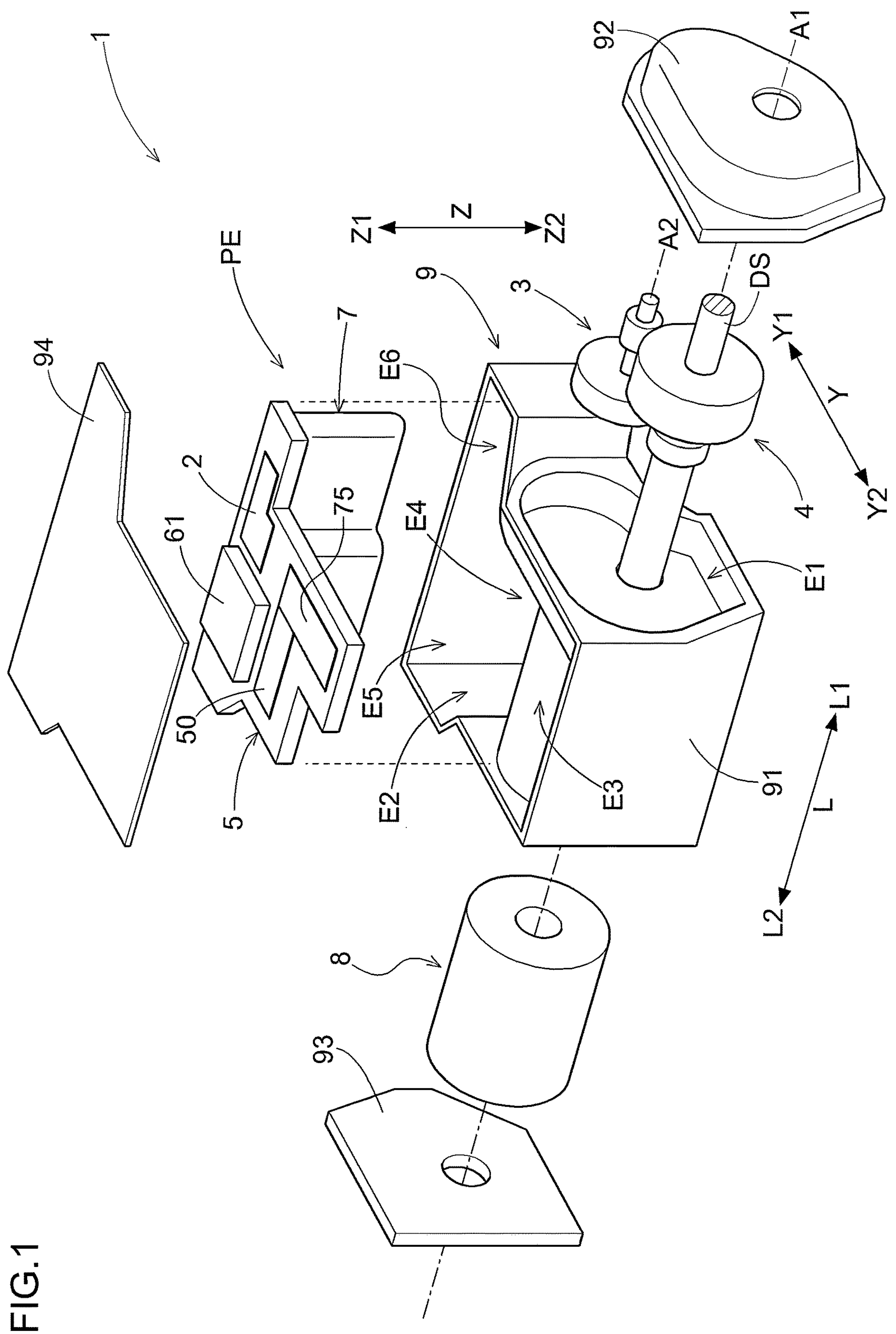
FIG. 1 is a schematic exploded perspective view of a vehicle drive device.
Figure 2:
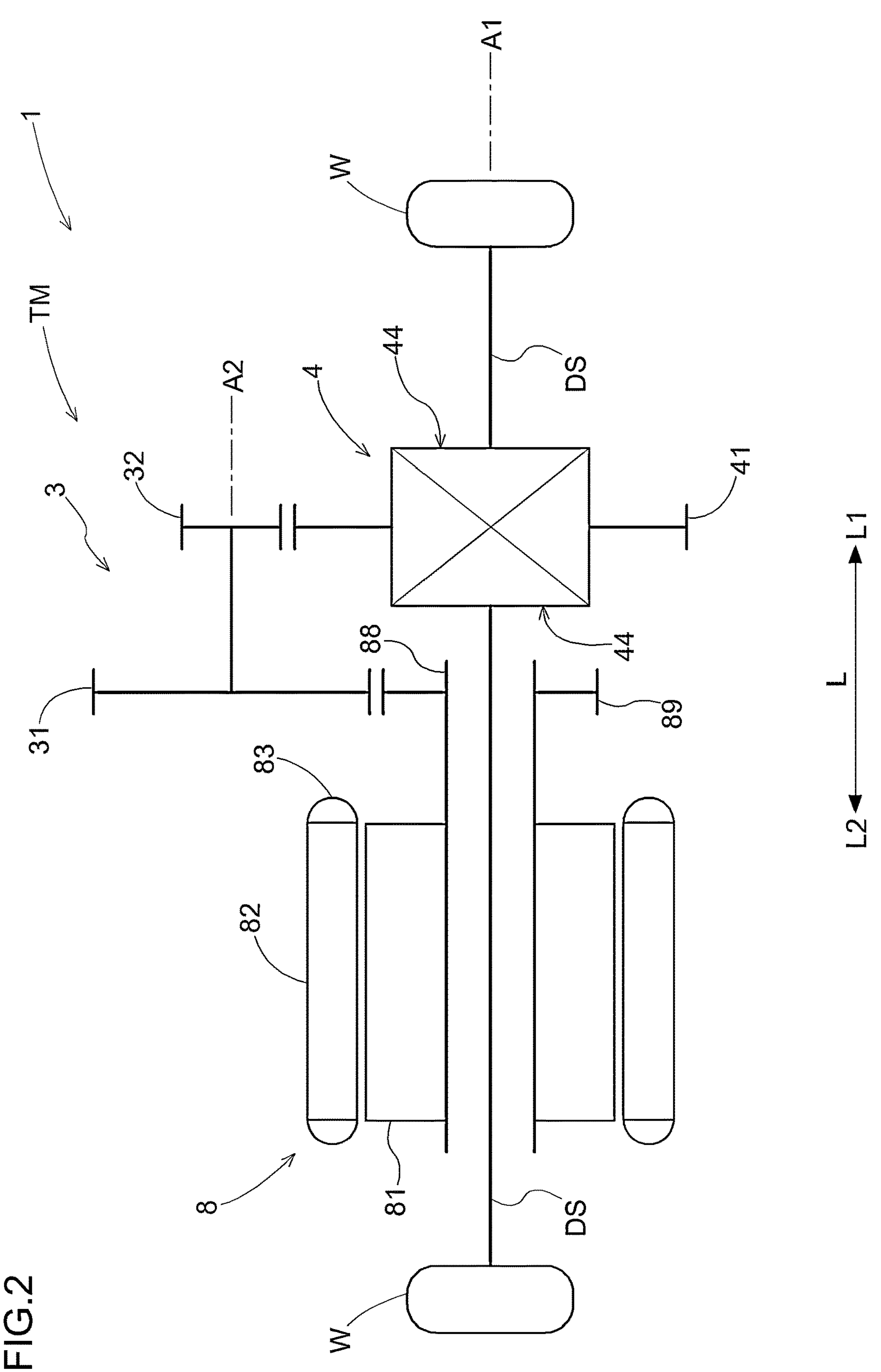
FIG. 2 is a skeleton diagram of the vehicle drive device.
Figure 3:
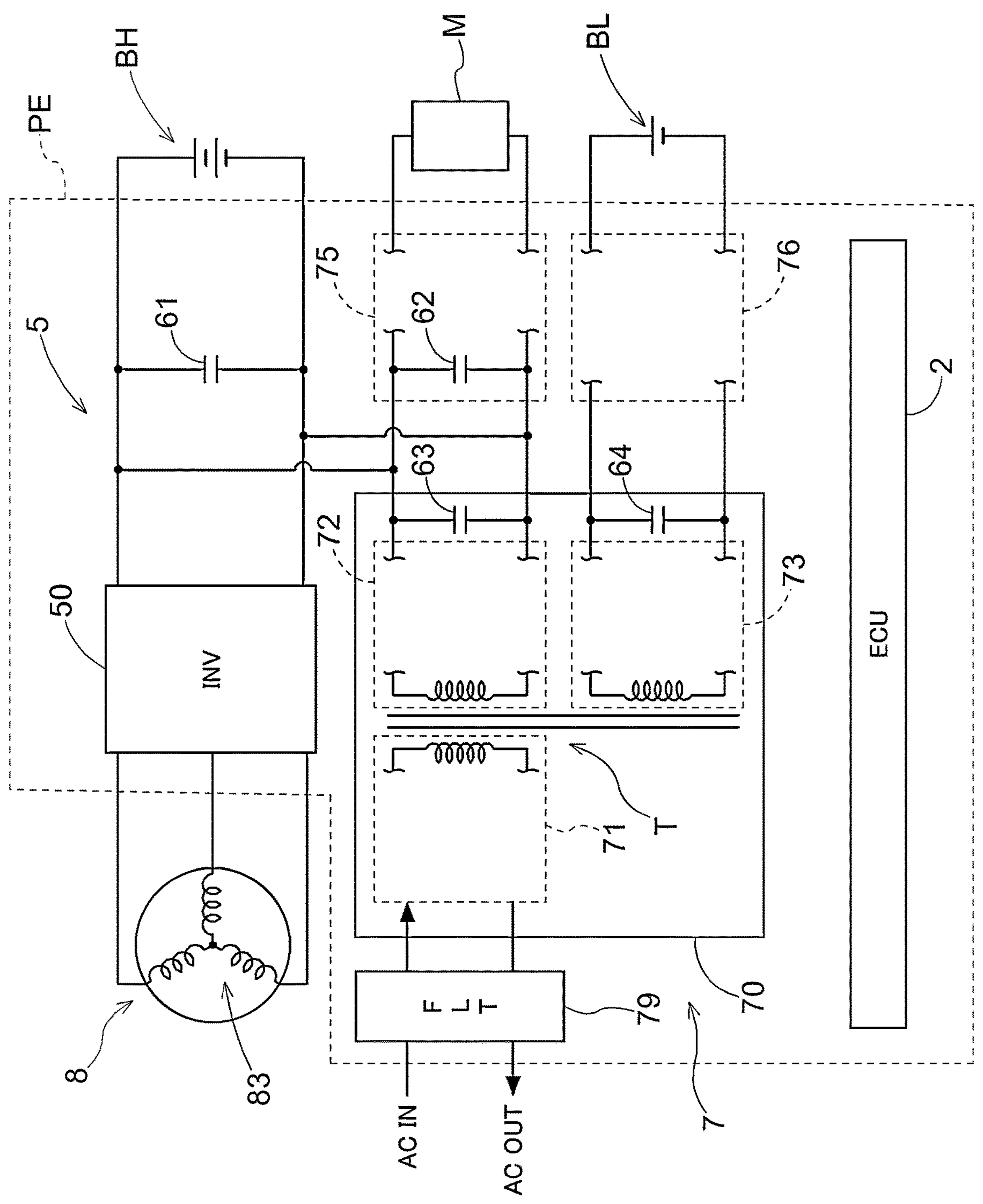
FIG. 3 is a schematic circuit block diagram of the vehicle drive device.

An embodiment of a vehicle drive device will be described below with reference to the drawings. FIG. 1 is a schematic exploded perspective view of a vehicle drive device 1, FIG. 2 is a skeleton diagram of the vehicle drive device 1, and FIG. 3 illustrates a schematic circuit block diagram of the vehicle drive device 1. As illustrated in FIGS. 1 and 2, the vehicle drive device 1 includes a rotary electric machine 8 that includes a rotor 81, output members (a drive shaft DS and a differential side gears 44) that are drivingly connected to wheels W, a power transmission mechanism TM that transmits driving force between the rotary electric machine 8 and the output members, an inverter module 5, a power source module 7, and a case 9. The inverter module 5 is a circuit module for drive-controlling the rotary electric machine 8. The power source module 7 is a circuit module of a power source system that is electrically connected to an in-vehicle battery (high-voltage battery BH). The case 9 is formed including a case body 91, a first side cover 92, a second side cover 93, and an upper cover 94, and a housing space is formed in a space surrounded by the case body 91, the first side cover 92, the second side cover 93, and the upper cover 94.

Note that as used herein, "being drivingly connected" means a state in which two rotational elements are connected to each other in such a manner that driving force can be transmitted therebetween, and includes a state in which the two rotational elements are connected to each other in such a manner as to integrally rotate or a state in which the two rotational elements are coupled to each other in such a manner that driving force can be transmitted therebetween via one or two or more transmission members. Examples of such a transmission member include various types of members that transmits rotation at the same speed or by changing speed, such as a shaft, a gear mechanism, a belt, and a chain. Note that examples of the transmission member may include an engagement device that selectively transmits rotation and driving force, such as a friction engagement device and a gearing type engagement device. In addition, as used herein, "integrally rotate" means integrally rotating regardless of whether separably or inseparably rotating. That is, a plurality of members that integrally rotate may be integrally formed of the same member or may be formed of separate members and integrated by welding, spline connection, or the like. In addition, as used herein, two elements "overlapping each other in a specific direction view" with regard to an arrangement of the two element means that when a virtual straight line that is parallel with the view direction is moved in respective directions orthogonal to the virtual straight line, at least some area in which the virtual straight line crosses both of the two elements exists.

In the present embodiment, a direction along a rotor axis (first axis A1) that is a rotational axis of the rotor 81 is defined as an axial direction L. In addition, one side in the axial direction L is defined as an axial direction first side L1 and the other side in the axial direction L is defined as an axial direction second side L2. In addition, in the present embodiment, a direction along a vertical direction while the vehicle drive device 1 is in a state of being mounted on a vehicle in a standard posture is defined as an up-down direction Z, and an upper side and a lower side in the up-down direction Z are defined as an upper side Z1 and a lower side Z2, respectively. In other words, the up-down direction Z is a direction in the vehicle drive device 1, and when the vehicle drive device 1 is mounted on the vehicle in the standard posture, the up-down direction Z coincides with the vertical direction. Therefore, when the vehicle drive device 1 is mounted on the vehicle while being inclined with respect to the standard posture, the up-down direction Z sometimes does not coincide with the vertical direction. An angle of the inclination is not prevented from exceeding 90 degrees. In addition, a direction orthogonal to the rotor axis (first axis A1) in an up-down direction Z view is defined as an axis-orthogonal direction Y, and one side in the axis-orthogonal direction Y is defined as an axis-orthogonal direction first side Y1 and the other side in the axis-orthogonal direction Y is defined as an axis-orthogonal direction second side Y2.

As illustrated in the skeleton diagram in FIG. 2, the rotary electric machine 8 is an inner rotor-type rotary electric machine that includes a stator 82 fixed to the case 9 and the rotor 81 arranged on an inner side in a radial direction of the stator 82. On the stator 82, a stator coil 83 is wound. The rotor 81 is coupled to the rotor shaft 88 arranged on the inner side in the radial direction of the rotor 81, and the rotor 81 and the rotor shaft 88 integrally rotate. In the present embodiment, the rotor shaft 88 is a hollow cylindrical member, and as described later, on the inner side in the radial direction of the rotor shaft 88, the drive shaft DS (which may be a connection member, as described later) penetrates. The rotor shaft 88, the rotor 81, and the drive shaft DS are arranged on the first axis A1. On the rotor shaft 88, an input gear 89 is integrally formed. The input gear 89 and the rotor shaft 88 may be integrally formed of the same member or formed of separate members and joined by welding or the like.

Figure 7:
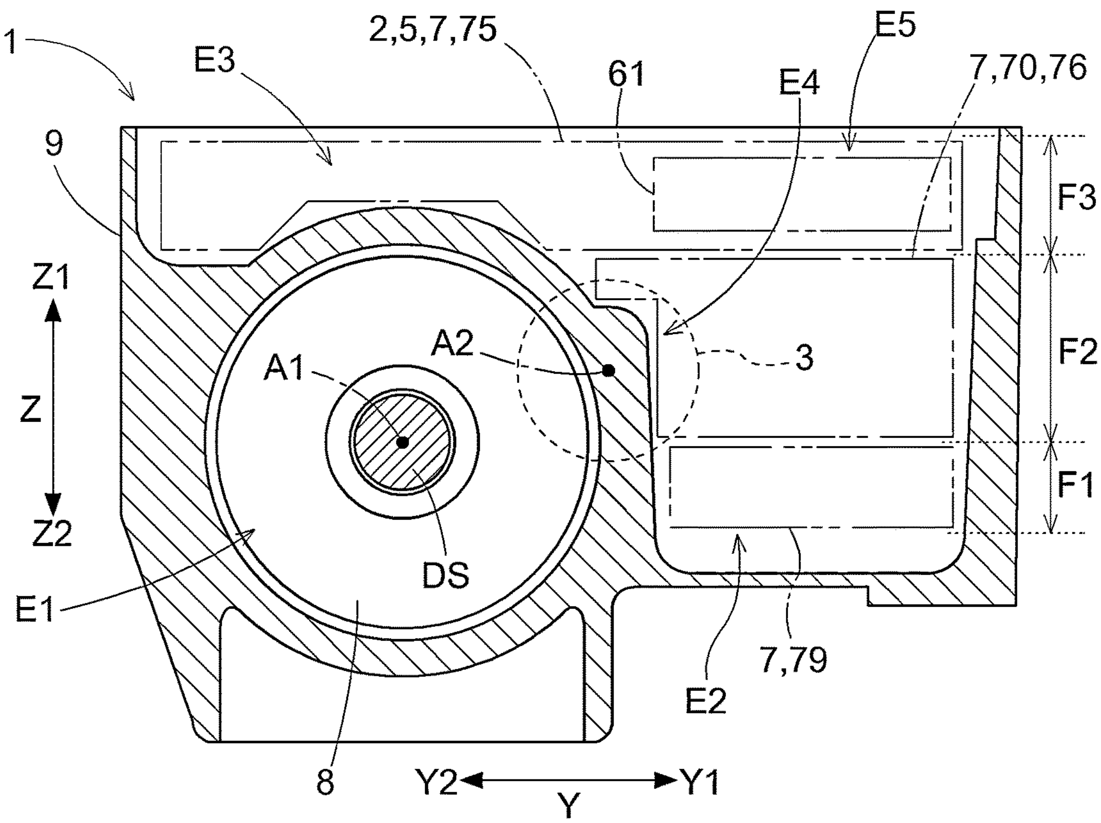
FIG. 7 is a schematic axially orthogonal cross-sectional view of the vehicle drive device viewed from an axial direction first side.
Figure 8:
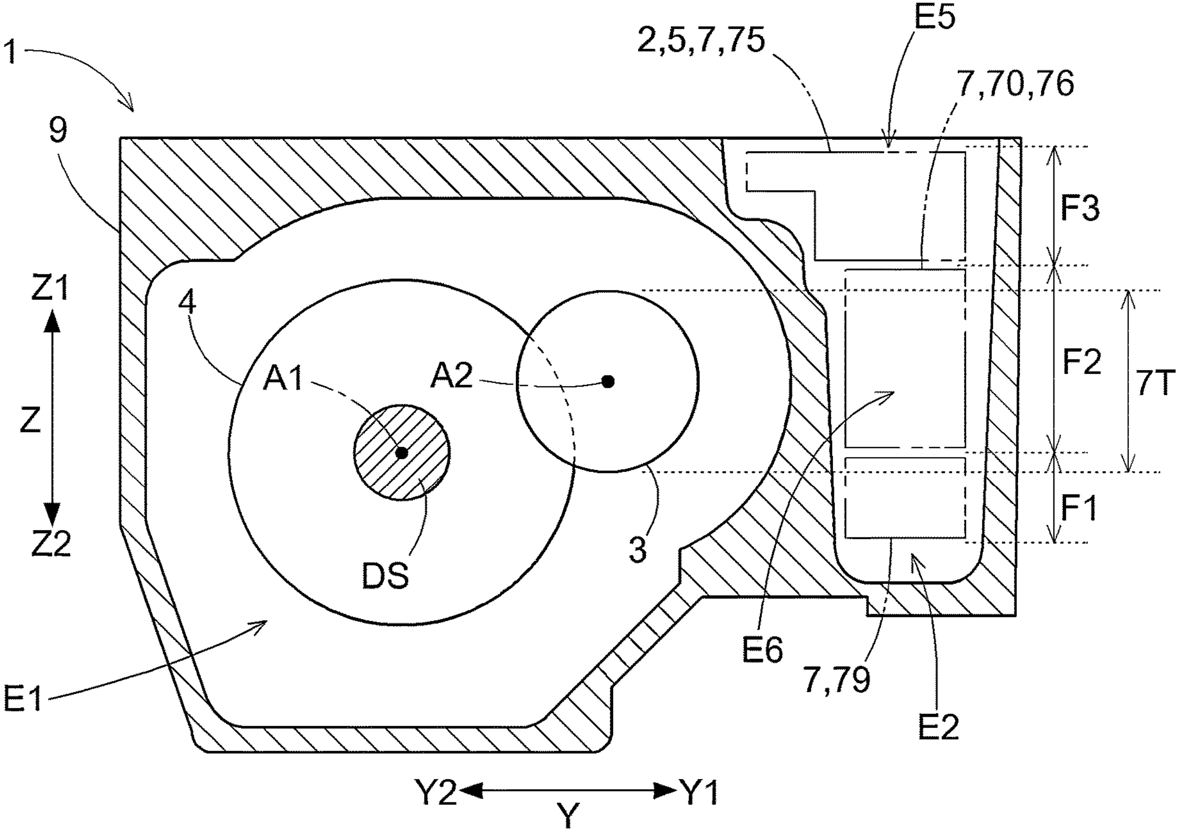
FIG. 8 is another schematic axially orthogonal cross-sectional view of the vehicle drive device viewed from the axial direction first side.

The input gear 89 meshes with a first counter gear 31. The first counter gear 31 integrally rotates with a second counter gear 32 that has a smaller diameter than the first counter gear 31. Because of this configuration, speed of rotation transmitted from the rotor shaft 88 to the first counter gear 31 via the input gear 89 is reduced and the rotation is output from the second counter gear 32. The first counter gear 31 and the second counter gear 32 constitute a counter gear mechanism 3 that functions as a reduction gear. The counter gear mechanism 3 is arranged on a second axis A2 that is parallel with the first axis A1 and that is a separate axis from the first axis A1. As illustrated in FIGS. 7 and 8, the second axis A2 is located on the axis-orthogonal direction first side Y1 with respect to the first axis A1. Therefore, it can be said that the second axis A2 is an offset axis that is offset to the axis-orthogonal direction first side Y1 with respect to the first axis A1 (the rotor axis and an output axis, which will be described later). It can also be said that the counter gear mechanism 3 arranged on the second axis A2 (the offset axis) is an offset gear mechanism. In addition, in the present embodiment, the counter gear mechanism 3 is arranged on the axial direction first side L1 with respect to the rotary electric machine 8.

The second counter gear 32 meshes with a differential ring gear 41 that is an input gear (differential input gear) to a differential gear mechanism 4. Although illustration is omitted since a configuration of the differential gear mechanism 4 is a known configuration, the differential gear mechanism 4 is a bevel gear-type differential gear mechanism and includes differential pinion gears each of which is a bevel gear and the differential side gears 44. The differential pinion gears are supported by a differential case and are also rotatably supported by pinion shafts that are arranged in such a manner as to extend in radial directions. The pinion shafts integrally rotate with the differential case, and each differential pinion gear is configured to be rotatable about a corresponding pinion shaft and revolvable about a rotational axis of the differential case (herein, the first axis A1). The plurality of pinion shafts are arranged in a radial manner (for example, in a cross shape) with the rotational axis of the differential case at the center, and to each of the plurality of pinion shafts, a differential pinion gear is attached. The differential case houses the pinion gears, the differential side gears 44, and the pinion shafts thereinside. The differential case integrally rotates with the differential ring gear 41.

The differential side gears 44 are arranged in a pair separated from each other on the axial direction first side L1 and the axial direction second side L2. Each of the pair of differential side gears 44 is arranged in such a manner as to mesh with the plurality of pinion gears and also rotate about the rotational axis of the differential case. As illustrated in FIG. 2, the differential side gear 44 on the axial direction first side L1 is coupled to the drive shaft DS on the axial direction first side L1 and is drivingly connected to a wheel W on the axial direction first side L1. The differential side gear 44 on the axial direction second side L2 is coupled to the drive shaft DS on the axial direction second side L2 and is drivingly connected to a wheel W on the axial direction second side L2. Note that since the differential gear mechanism 4 is arranged on the axial direction first side L1 with respect to the rotary electric machine 8, the drive shaft DS on the axial direction second side L2 penetrates the inner side in the radial direction of the hollow cylindrical rotor shaft 88 and extends to the axial direction second side L2 of the rotary electric machine 8. The drive shaft DS on the axial direction second side L2 may be formed of a member (a so-called drive shaft) drivingly connected to the wheel W and a connection member that is connected to the differential side gear 44 and that connects the member and the differential side gear 44.

The differential side gears 44 and the drive shaft DS are equivalent to the output members in the vehicle drive device 1. In the present embodiment, the output axis that is a rotational axis of the output members is also the first axis A1. That is, the vehicle drive device 1 of the present embodiment has a two axis configuration in which the output axis that is the rotational axis of the output members is arranged on the first axis A1 that is coaxial with the rotor axis and the offset gear mechanism is arranged on the offset axis (the second axis A2).

The rotary electric machine 8 functions as a driving force source of the pair of wheels W. As illustrated in FIG. 3, the rotary electric machine 8 is electrically connected, via an inverter 50, to a high-voltage battery BH that is a DC power source formed of a chargeable secondary battery, such as a lithium-ion battery, or a power storage device, such as an electric double layer capacitor. Between the high-voltage battery BH and the inverter 50, a first DC link capacitor 61 that functions as a smoothing capacitor that smooths voltage on a DC side of the inverter 50 is installed.

The rotary electric machine 8 has a function as a motor that generates motive power upon receiving supply of electric power from the high-voltage battery BH and a function as a generator that generates electric power upon receiving supply of motive power from a wheel W side. The rotary electric machine 8 performs power running using electric power stored in the high-voltage battery BH and thereby generates driving force, and also generates electric power using driving force transmitted from the pair of wheel W sides and thereby charges the high-voltage battery BH. A rated voltage of the high-voltage battery BH is approximately 200 to 800 volts.

As described above, the rotary electric machine 8 is a driving force source of wheels and is a so-called traction rotary electric machine. A vehicle sometimes includes an auxiliary machine rotary electric machine M that serves as a driving force source of an auxiliary machine, such as an air conditioner and an electric oil pump, in addition to a traction rotary electric machine. Although in a conventional vehicle that uses only an internal-combustion engine as a driving force source of wheels, waste heat from the internal-combustion engine can be used for an air conditioner, in a hybrid vehicle or an electric vehicle, use of as much waste heat as the internal-combustion engine cannot be expected, temperature adjustment by a heat pump or the like is required, and output required for the auxiliary machine rotary electric machine tends to increase. In addition, differing from an internal-combustion engine that is constantly in motion, such as when idling, even when the vehicle stops (when the vehicle is in a state in which the wheels do not rotate), the traction rotary electric machine ceases to move when the vehicle stops. Since a mechanical oil pump that requires motive power of an internal-combustion engine to suck and discharge oil cannot supply oil for lubrication or oil for cooling while the vehicle using the traction rotary electric machine is standing still and an electric oil pump is thus used, the output required for the auxiliary machine rotary electric machine also tends to increase.

The number of vehicles that are configured such that to cause the auxiliary machine rotary electric machine M to output a large driving force, the auxiliary machine rotary electric machine M is, as with the traction rotary electric machine, supplied with electric power from the high-voltage battery BH has increased. On the other hand, as output required for the traction rotary electric machine increases, the rated voltage of the high-voltage battery BH tends to become higher. Thus, in some cases, when the rated voltage of the high-voltage battery BH is too high for the auxiliary machine rotary electric machine M, a voltage conversion circuit that steps down DC power supplied from the high-voltage battery BH is installed. In the present embodiment, a configuration that includes a first DC-DC converter 75 as such a voltage conversion circuit is exemplified. On the high-voltage battery BH side of the first DC-DC converter 75, a second DC link capacitor 62 is also installed to smooth DC voltage.

Note that in the present embodiment, the high-voltage battery BH is configured to be chargeable by not only electric power that the rotary electric machine 8 generates but also electric power supplied from an external AC power source, such as a commercial AC power source having a rated voltage of approximately 100 to 240 volts. Thus, the high-voltage battery BH is configured to be connectable to an external power source via an in-vehicle charging device 70 including a charging circuit. In addition, recent years, using a battery mounted on an electric vehicle or a hybrid vehicle as an emergency power source at the time of a disaster or the like has been proposed. Therefore, in the present embodiment, the in-vehicle charging device 70 is configured including not only a function of the charging circuit but also a function of a power supply circuit. Needless to say, the in-vehicle charging device 70 may be configured including only the function of the charging circuit.

The above-described emergency power source is often installed to be able to output AC power to a point to which an external AC power source is connected, that is, to the outside of the vehicle. On the other hand, some vehicles include an AC power supply socket to supply electric power to a general low-power-consumption household appliance or the like in a vehicle interior. A power supply circuit to supply AC power to such an AC power supply socket may be installed.

The in-vehicle charging device 70 of the present embodiment includes a dual active bridge (DAB) circuit including a transformer T and converts AC power (AC IN) supplied from the external AC power source side to first DC power and second DC power. When viewed from an AC side, the transformer T includes a primary-side coil and two secondary-side coils. For example, a primary-side circuit 71 is formed by connecting a full-bridge circuit formed of switching elements to the primary-side coil. Likewise, a first secondary-side circuit 72 is formed by connecting a full-bridge circuit to a first secondary-side coil, and a second secondary-side circuit 73 is also formed by connecting a full-bridge circuit to a second secondary-side coil.

The first secondary-side circuit 72 generates the first DC power to charge the high-voltage battery BH. In an output portion of the first secondary-side circuit 72, a third DC link capacitor 63 that smooths voltage of the first DC power is installed. The second secondary-side circuit 73 generates the second DC power having a lower voltage than the first DC power. In an output portion of the second secondary-side circuit 73, a fourth DC link capacitor 64 that smooths voltage of the second DC power is installed.

As illustrated in FIG. 3, the vehicle includes, in addition to the high-voltage battery BH, a low-voltage battery BL that has a lower rated voltage than the high-voltage battery BH. A rated power source voltage of the low-voltage battery BL is, for example, approximately 12 to 24 volts. In conventional vehicles that use only an internal-combustion engine as a driving force source of wheels W, such a low-voltage battery BL has been charged with electric power generated by an alternator using motive power of the internal-combustion engine. The vehicle of the present embodiment that includes the high-voltage battery BH is configured to be able to charge the low-voltage battery BL with electric power supplied from the high-voltage battery BH or an external AC power source. The vehicle of the present embodiment is able to charge the low-voltage battery BL from the high-voltage battery BH via the first secondary-side circuit 72, the transformer T, and the second secondary-side circuit 73 or from the external AC power source via the primary-side circuit 71, the transformer T, and the second secondary-side circuit 73. In the present embodiment, a mode in which a second DC-DC converter 76 is installed as a voltage conversion circuit that further steps down the voltage of the second DC power is exemplified. Note that the low-voltage battery BL may be a lead-acid storage battery as with a conventional vehicle using an internal-combustion engine as a driving force source of wheels.

In the present embodiment, since, as described above with reference to FIG. 3, the in-vehicle charging device 70 is formed using the transformer T, insulation among the external AC power source, the high-voltage battery BH, and the low-voltage battery BL can be secured.

In addition, the external AC power source and the in-vehicle charging device 70 are connected via an electromagnetic interference (EMI) filter 79 that reduces EMI noise. When the in-vehicle charging device 70 functions as a power supply circuit, AC power (AC OUT) is also output from the in-vehicle charging device 70 via the EMI filter 79. In the present embodiment, the power source module 7 is formed including the EMI filter 79, the in-vehicle charging device 70 (the charging circuit and the power supply circuit), and the voltage conversion circuits (the first DC-DC converter 75 and the second DC-DC converter 76). The power source module 7 is, without being limited to this mode, only required to be configured including at least one of the charging circuit, the power supply circuit, and the voltage conversion circuits.

The rotary electric machine 8 is drive-controlled by a rotary electric machine control unit, based on target torque of the rotary electric machine 8 that is set in accordance with a command from a not-illustrated vehicle control device that serves as a higher-level control device. The rotary electric machine control unit switching-controls the inverter 50 that is formed of a plurality of switching elements and thereby causes the inverter 50 to convert electric power between DC and a plurality of phases (in the present embodiment, three phases) of AC. In the present embodiment, the rotary electric machine control unit is configured as an ECU 2 (control device) in conjunction with a charging control unit that controls the in-vehicle charging device 70, a first voltage conversion control unit that control the first DC-DC converter 75, a second voltage conversion control unit that controls the second DC-DC converter 76, and the like.

The ECU 2 is configured with a processor, such as a microcomputer, as a core component, and operating voltage of the ECU 2 is 3.3 to 5 volts. Voltage applied to the inverter 50, which is connected to the high-voltage battery BH, is several hundred volts, and voltage of switching control signals to switching elements that constitute the inverter 50, such as insulated gate bipolar transistors (IGBTs) and power metal oxide semiconductor field effect transistors (MOSFETs), is approximately 15 to 24 volts. Thus, between the ECU 2 and the inverter 50, a drive circuit that amplifies voltage of the switching control signals output from the ECU 2, increases driving force, and supplies the inverter 50 with the switching control signals is installed. Although in FIG. 3, the drive circuit is not illustrated, the inverter module 5 having the inverter 50 as a core component is formed including the drive circuit as described above. The inverter module 5 may be configured including at least some of control circuits other than the drive circuit and the first DC link capacitor 61.

Figure 4:
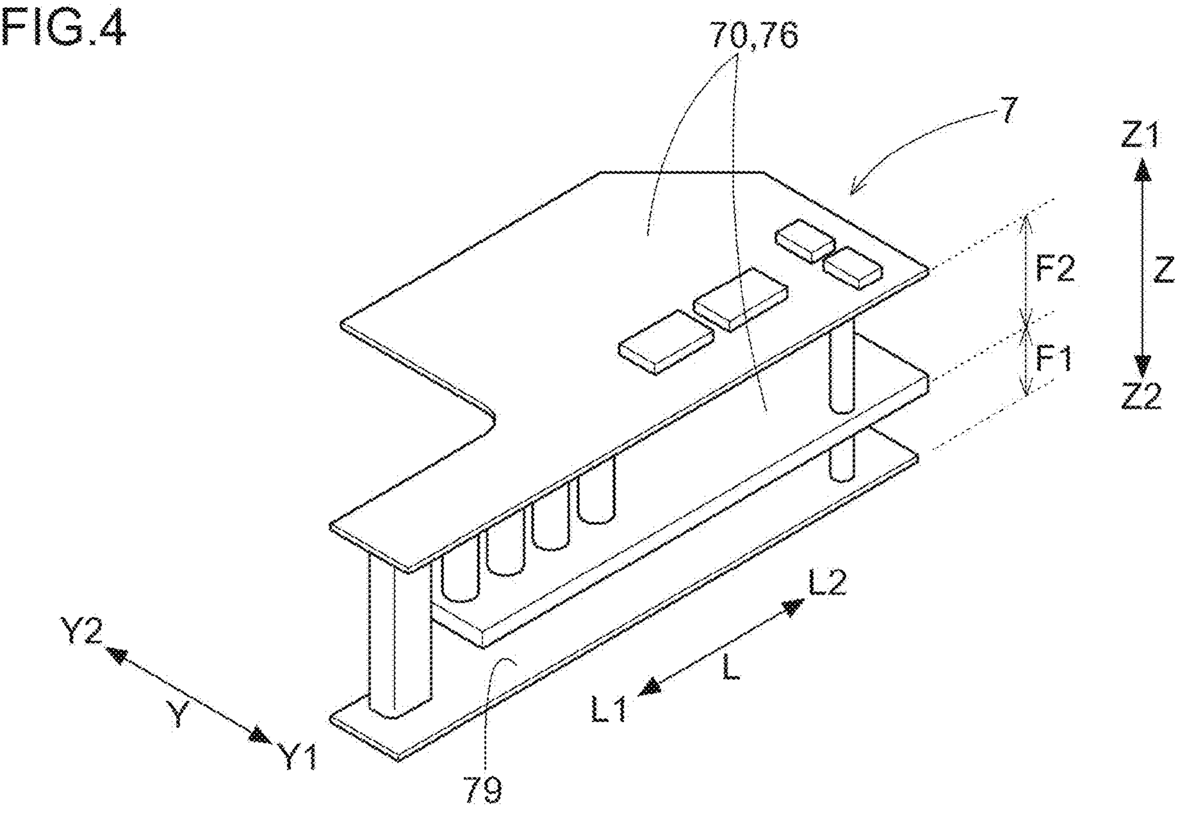
FIG. 4 is a schematic perspective view of a power source module.
Figure 5:
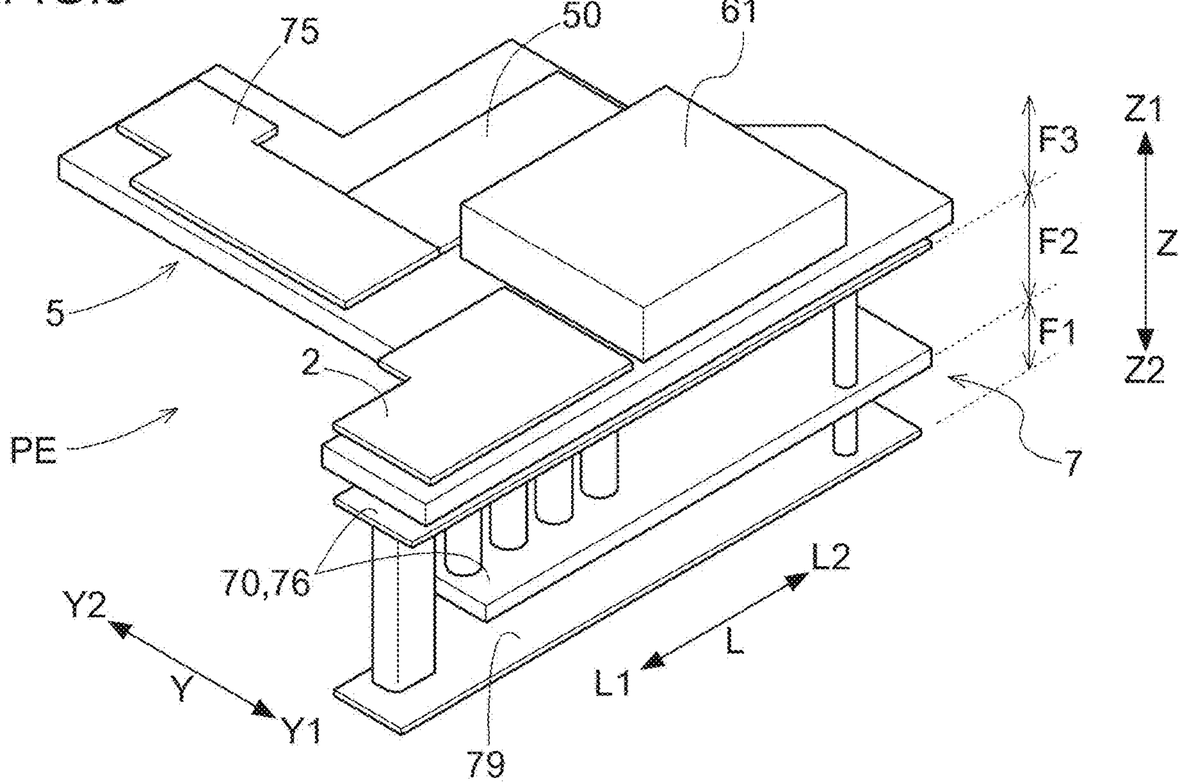
FIG. 5 is a schematic perspective view of a power system assay.
Figure 6:
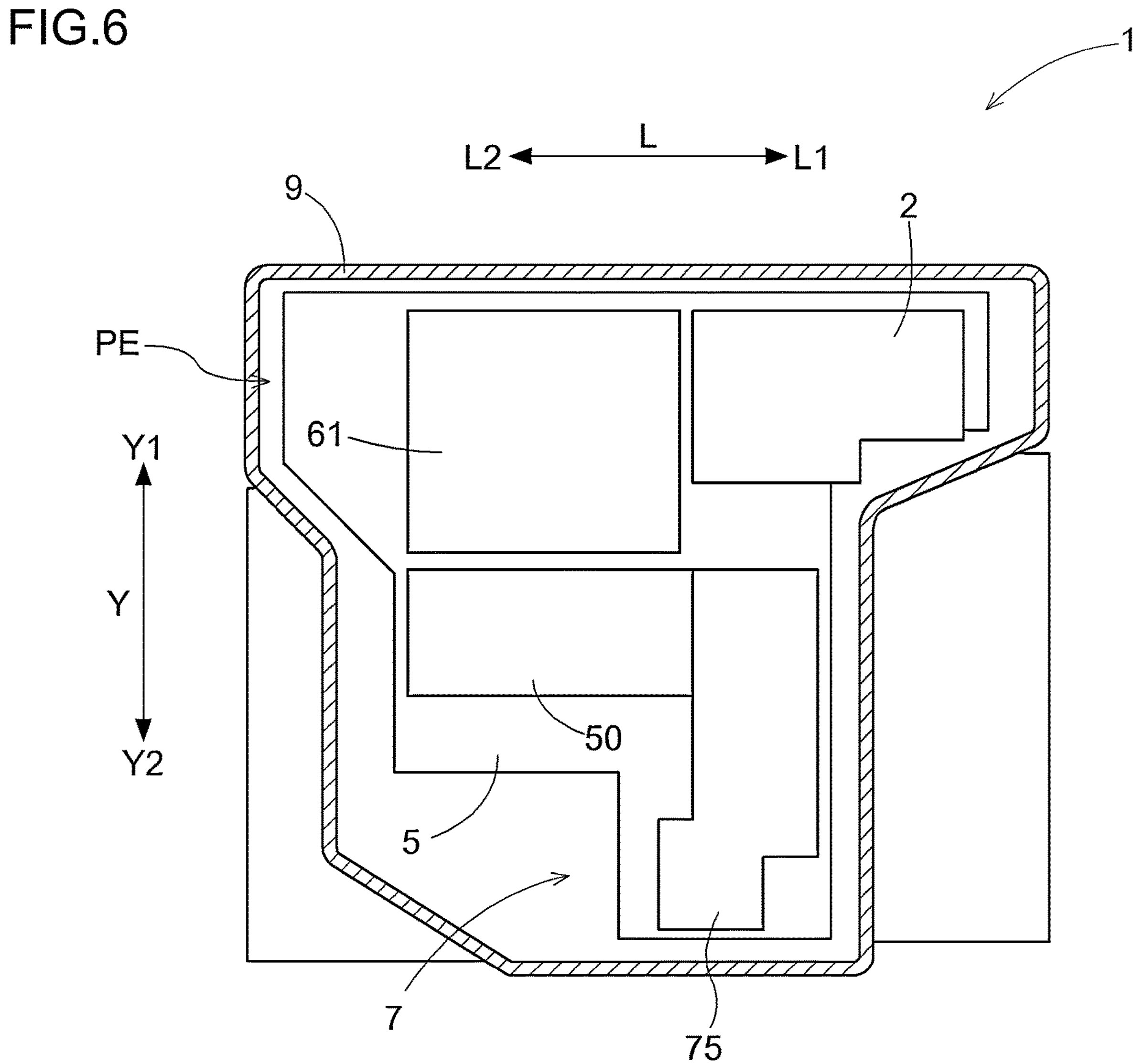
FIG. 6 is a schematic top view of the vehicle drive device while a third cover is removed.

In the present embodiment, a power circuit assembly PE is configured including the inverter module 5 and the power source module 7. As illustrated in FIG. 4, in the power source module 7, a filter board on which the EMI filter 79 is formed is arranged on the lowermost side Z2 in the up-down direction Z, and the in-vehicle charging device 70 and the second DC-DC converter 76 are arranged on the upper side Z1 of the EMI filter 79. As illustrated in FIGS. 5 and 6, on the power source module 7, the inverter module 5, the first DC link capacitor 61, the first DC-DC converter 75, and the ECU 2 are arranged on the uppermost side Z1 in the up-down direction Z. That is, the EMI filter 79 is arranged in a first floor portion F1 in the up-down direction Z, the in-vehicle charging device 70 and the second DC-DC converter 76 are arranged in a second floor portion F2, and the inverter module 5, the first DC-DC converter 75, the first DC link capacitor 61, and the ECU 2 are arranged in a third floor portion F3.

In the present embodiment, as described above with reference to FIG. 5, a mode in which the power source module 7 is configured including a plurality of boards arranged in line in the up-down direction Z is exemplified. However, for example, the power source module 7 may be formed by combining an L-shaped board, a board expanding along the up-down direction Z, and a board expanding in the axial direction L and the axis-orthogonal direction Y.

Note that although not illustrated in FIGS. 4 and 5, it is suitable that the second DC link capacitor 62, the third DC link capacitor 63, the fourth DC link capacitor 64, and the like are, for example, arranged in the second floor portion F2. The second DC link capacitor 62 may be arranged in the third floor portion F3. In addition, the first DC link capacitor 61 and the second DC link capacitor 62 may be commonly used, integrally formed, and arranged at one point. Likewise, the third DC link capacitor 63 and one or both of the first DC link capacitor 61 and the second DC link capacitor 62 may be commonly used, integrally formed, and arranged at one point. Note that since the DC link capacitors are large in size, the DC link capacitors may be arranged in a distributed manner in both the second floor portion F2 and the third floor portion F3.

A housing form of the power circuit assembly PE in the case 9 is described below with reference to also FIGS. 7 to 9. The case 9 includes a first housing chamber E1 for housing the rotary electric machine 8 and the power transmission mechanism TM and a second housing chamber E2 for housing the power circuit assembly PE (the inverter module 5 and the power source module 7), as illustrated in FIG. 1. The first housing chamber E1 and the second housing chamber E2 are partitioned from each other by a partition wall. Although in the first housing chamber E1, an area in which the rotary electric machine 8 is housed and an area in which the power transmission mechanism is housed may be partitioned from each other by a wall to support a bearing or the like, both areas communicate with each other in some portion even when the areas are partitioned from each other. Although in the present embodiment, the second housing chamber E2 is not partitioned and the inverter module and the power source module are housed in one chamber, the second housing chamber E2 may have a wall that partially partitions the second housing chamber E2 into areas as long as the partitioned areas communicate with each other in some portion to secure a path for wiring or the like.

Figure 9:
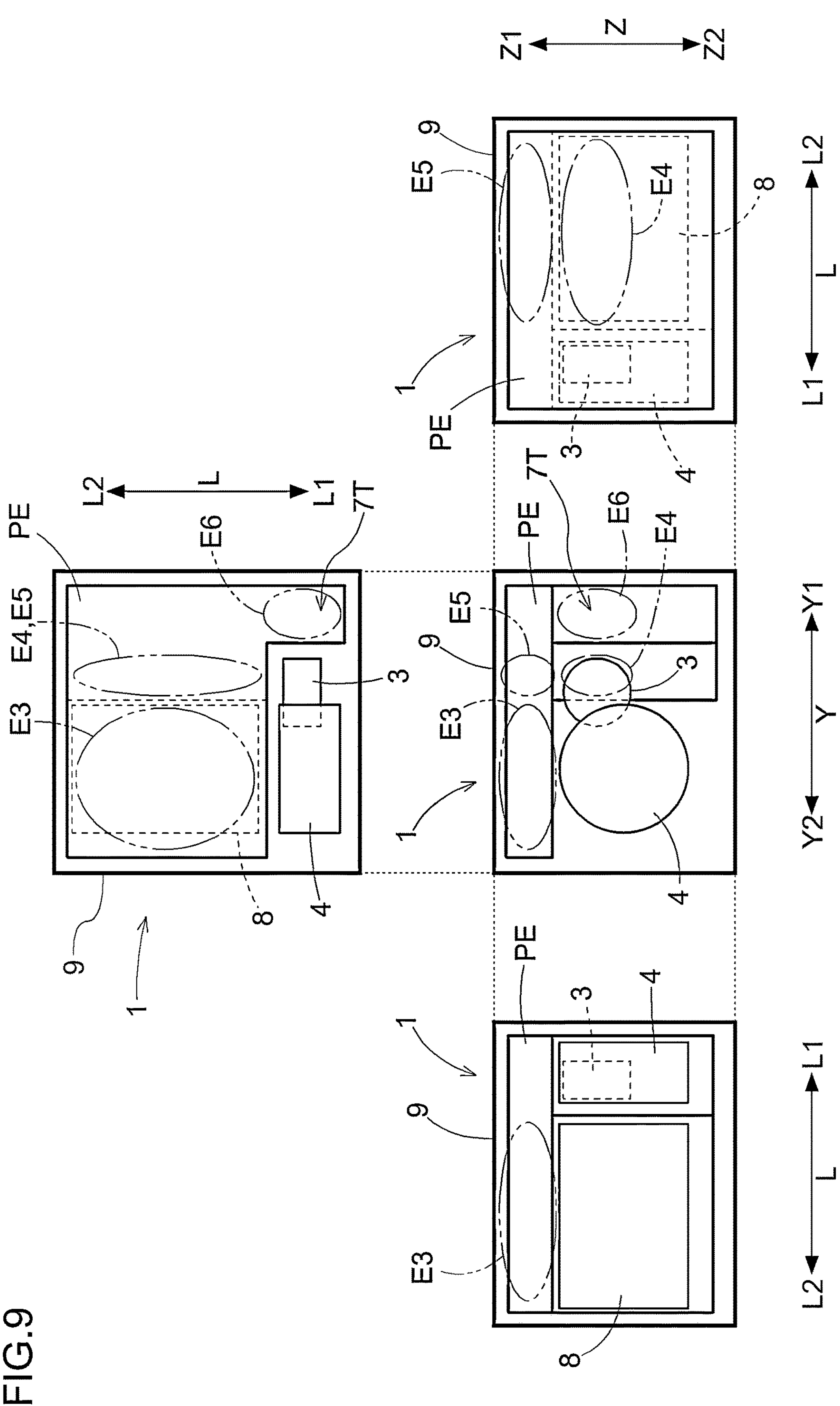
FIG. 9 is a schematic four side view of the vehicle drive device.

In addition, as illustrated in FIGS. 1, 7, 9, and the like, the second housing chamber E2 includes an upper area E3 that is an area located on the upper side Z1 with respect to the rotary electric machine 8 and overlapping the rotary electric machine 8 in the up-down direction Z view while the vehicle drive device 1 is in an in-vehicle state of being mounted on the vehicle. In addition, the second housing chamber E2 includes a lateral area E4 that is an area located on the axis-orthogonal direction first side Y1 with respect to the rotary electric machine 8, not overlapping the rotary electric machine 8 in the up-down direction Z view, and overlapping the counter gear mechanism 3, which serves as an offset gear mechanism, in an axial direction L view. At least a portion of the inverter module 5 is arranged in the upper area E3, and at least a portion of the power source module 7 is arranged in the lateral area E4. As illustrated in FIG. 7, in the present embodiment, the entire inverter module 5 is arranged in the upper area E3. However, a portion of the inverter module 5 may be arranged in a connection area E5, which will be described later, (see FIGS. 1, 7, 9, and the like). In addition, in the present embodiment, the power source module 7 is arranged in the upper area E3, the lateral area E4, the connection area E5, and an outer side area E6 (see FIGS. 1, 8, 9, and the like).

Since the inverter module 5 and the power source module 7 are housed in one second housing chamber E2, sharing of components, such as a DC link capacitor and an ECU, between the inverter module 5 and the power source module 7 can be easily achieved, as is evident from the circuit block diagram in FIG. 3 and a perspective view in FIG. 5. Thus, reduction in the numbers of components and reduction in weights of the inverter module 5 and the power source module can be easily achieved. In addition, since the inverter module 5 is arranged in the upper area E3 and the power source module 7 is arranged in the lateral area E4, miniaturization in the up-down direction Z of the vehicle drive device 1 can be easily achieved, compared with a configuration in which both the inverter module 5 and the power source module 7 are, for example, arranged in an area located on the upper side Z1 with respect to the rotary electric machine 8. In addition, since the power source module 7 can be arranged by making use of a space that is generated on the axis-orthogonal direction first side Y1 with respect to the rotary electric machine 8 by the counter gear mechanism 3 being arranged, it is easy to prevent the vehicle drive device 1 from becoming larger in size, even when the vehicle drive device 1 further includes the power source module 7 in addition to the rotary electric machine 8, the output members, the power transmission mechanism TM, and the inverter module 5.

Capacitors and inductors used in the power source module 7 including the in-vehicle charging device 70, the EMI filter 79, and the like are often required to have large capacities as the power source module 7 becomes necessary to deal with a large current. Thus, the capacitors and inductors tend to become larger in size. Since according to the present embodiment, it is easy to secure a large housing space in the up-down direction Z, the vehicle drive device 1 can be prevented from becoming larger in dimension in the up-down direction Z.

In addition, as illustrated in FIGS. 4, 5, and the like, a dimension in the up-down direction Z of the power source module 7 is larger than a dimension in the up-down direction Z of the inverter module 5, and a dimension in the axis-orthogonal direction Y of the inverter module 5 is larger than a dimension in the axis-orthogonal direction Y of the power source module 7.

As illustrated in FIG. 9 and the like, the lateral area E4 that is an area located on the axis-orthogonal direction first side Y1 with respect to the rotary electric machine 8 and not overlapping the rotary electric machine 8 in the up-down direction Z view overlaps the counter gear mechanism 3 in the axial direction L view. Thus, the lateral area E4 can be disposed over a wide range in an arrangement area in the up-down direction Z of the rotary electric machine 8, and even when a wider area than the upper area E3 is secured in the up-down direction Z, a dimension in the up-down direction Z of the vehicle drive device 1 can be easily prevented from increasing. In addition, as illustrated in FIG. 9 and the like, the upper area E3 that overlaps the rotary electric machine 8 in the up-down direction Z view can be disposed over a substantially whole area in the axis-orthogonal direction Y above the rotary electric machine 8. That is, an expanse in the axis-orthogonal direction Y of the upper area E3 that is equivalent to a diameter of the rotary electric machine 8 can be easily secured. In other words, while the vehicle drive device 1 is prevented from becoming larger in size, a larger area in the up-down direction Z than the upper area E3 can be easily secured for the lateral area E4, and a larger area in the axis-orthogonal direction Y than the lateral area E4 can be easily secured for the upper area E3.

According to the present embodiment, since at least a portion of the power source module 7 that has a larger dimension in the up-down direction Z than the inverter module 5 is arranged in the lateral area E4 in which a dimension in the up-down direction Z can be more easily secured than in the upper area E3, miniaturization in the up-down direction Z of the vehicle drive device 1 can be easily achieved. In addition, since at least a portion of the inverter module 5 that has a smaller dimension in the up-down direction Z and has a larger dimension in the axis-orthogonal direction Y than the power source module 7 is arranged in the upper area E3, the inverter module 5 can be appropriately arranged while the vehicle drive device 1 is prevented from becoming larger in size.

The upper area E3 and the lateral area E4 are connected via the connection area E5, as illustrated in FIG. 9. In other words, the connection area E5 is located on the axis-orthogonal direction first side Y1 with respect to the upper area E3 and on the upper side Z1 in the up-down direction Z with respect to the lateral area E4. Note that a portion of the upper area E3 on the axis-orthogonal direction first side Y1 and a portion of the lateral area E4 on the upper side Z1 may be included in the connection area E5. As is evident from FIGS. 1, 5, 9, and the like, in the present embodiment, shared components shared by the inverter module 5 and the power source module 7, such as the ECU 2 and the first DC link capacitor 61, are arranged in the connection area E5 in which the upper area E3 and the lateral area E4 are connected.

According to this configuration, sharing components between the inverter module 5 and the power source module 7 enables reduction in the combined number of components and reduction in combined weight of the inverter module 5 and the power source module 7 to be easily achieved. In addition, according to the present configuration, since such shared components are arranged in the connection area E5, in which the upper area E3 and the lateral area E4 are connected, both connection between the shared components and the inverter module 5 and connection between the shared components and the power source module 7 can be easily appropriately performed.

For example, the first DC link capacitor 61, the second DC link capacitor 62, and the third DC link capacitor 63 can be formed of the same capacitor. The capacitor being arranged in the connection area E5 enables wiring to be short when the capacitor is shared between the inverter module 5 and the first DC-DC converter 75 in the power source module 7 and between the inverter module 5 and the first secondary-side circuit 72 in the power source module 7. In addition, the ECU 2 switching-controls switching elements constituting the inverter 50 and the first DC-DC converter 75 and switching elements constituting the DAB in the in-vehicle charging device 70. The ECU 2 being arranged in the connection area E5 enables wiring to the ECU 2 to be short.

As described above, the pair of differential side gears 44 are equivalent to the output members. In the present embodiment, as illustrated in FIGS. 1, 2, and the like, the differential side gears 44 are arranged on the axial direction first side L1 with respect to the rotary electric machine 8. As illustrated in FIGS. 1, 2, and 9, a dimension in the axial direction L of the counter gear mechanism 3, which serves as an offset gear mechanism, is smaller than a dimension in the axial direction L of the rotary electric machine 8. In addition, the counter gear mechanism 3 is arranged on the axial direction first side with respect to the rotary electric machine 8. Note that the offset gear mechanism, such as the counter gear mechanism 3, is only required to have at least a portion thereof arranged on the axial direction first side with respect to the rotary electric machine 8. The lateral area E4 is formed on the axial direction second side L2 with respect to the counter gear mechanism 3. In the present embodiment, as illustrated in FIGS. 1, 8, 9, and the like, the second housing chamber E2 further includes the outer side area E6 that continues from the lateral area E4 on the axis-orthogonal direction first side Y1 with respect to the lateral area E4. In the outer side area E6, a target portion 7T (see FIG. 8) that is a portion of the power source module 7 is arranged. The target portion 7T is arranged to overlap the counter gear mechanism 3 in an axis-orthogonal direction view along the axis-orthogonal direction Y. In the present embodiment, the target portion 7T is equivalent to a portion that is arranged on the upper side Z1 of the first floor portion F1 and in the second floor portion F2.

At least a portion of the offset gear mechanism (for example, the counter gear mechanism 3) is arranged on the axial direction first side L1 with respect to the rotary electric machine 8 to transmit driving force between the offset gear mechanism and the output members arranged coaxially with the rotary electric machine 8. The lateral area E4 is located in an area that overlaps the offset gear mechanism (the counter gear mechanism 3) in the axial direction L view. That is, according to the present configuration, the power source module 7 can be arranged using a dead space generated on the axis-orthogonal direction first side Y1 with respect to the rotary electric machine 8 and on the axial direction second side L2 with respect to the offset gear mechanism (the counter gear mechanism 3) due to the dimension and arrangement of the offset gear mechanism (the counter gear mechanism 3) with respect to the rotary electric machine 8. Therefore, the vehicle drive device 1 can be effectively prevented from becoming larger in size due to including the power source module 7. In addition, according to the present configuration, a portion of the power source module 7 can be arranged using an area that is located on the axis-orthogonal direction first side Y1 of the offset gear mechanism (the counter gear mechanism 3) and that overlaps the offset gear mechanism in the axis-orthogonal direction Y view. That is, in the outer side area E6, which continues from the lateral area E4, the target portion 7T of the power source module 7 can be arranged. Therefore, in this respect, the vehicle drive device 1 can also be effectively prevented from becoming larger in size due to including the power source module 7.

As described above, capacitors and inductors used in the power source module 7 including the in-vehicle charging device 70, the EMI filter 79, and the like are often required to have large capacities as the power source module 7 becomes necessary to deal with a large current. Although thus, the capacitors and inductors tend to become larger in size, according to the present embodiment, such components can be appropriately housed, using a dead space. Therefore, while the size of the vehicle drive device 1 is suppressed to be small, a large number of devices can be housed.

OTHER EMBODIMENTS

Other embodiments are described below. Note that a configuration of each embodiment described below is not limited to a configuration applied alone and can also be applied in combination with a configuration of another embodiment as long as no contradiction arises.

(1) In the above description, the counter gear mechanism 3 that is arranged on the second axis A2 was exemplified as an offset gear mechanism. However, the offset gear mechanism may be a parallel shaft-type multi-speed transmission that is arranged on a plurality of shafts, such as a dual clutch transmission (DCT).

(2) When the high-voltage battery BH is charged using the in-vehicle charging device 70 and when AC power is output to the outside of the vehicle from the high-voltage battery BH, using the in-vehicle charging device 70, the rotary electric machine 8 has stopped and the inverter 50 has also stopped. Therefore, the inverter 50 can be shared with any one of bridge circuits constituting the dual active bridge circuit in the in-vehicle charging device 70 and a bridge circuit constituting the first DC-DC converter 75. In this case, it is suitable that the inverter 50 is included in shared components that are suitably arranged in the connection area E5. Likewise, the DC link capacitors can be shared by the in-vehicle charging device 70 and the inverter module 5.

As described in the foregoing, according to the present embodiment, the vehicle drive device 1 that houses the rotary electric machine 8, the output members, the power transmission mechanism TM, the inverter module 5, and the power source module 7 in the same case 9 can be formed smaller in size.

A vehicle drive device includes: a rotary electric machine including a rotor; an output member being drivingly connected to a wheel; a power transmission mechanism that transmits driving force between the rotary electric machine and the output member; an inverter module for drive-controlling the rotary electric machine; a power source module that is electrically connected to an in-vehicle battery and includes at least one of a voltage conversion circuit that performs conversion of voltage of the in-vehicle battery, a charging circuit for performing charging from an external power source to the in-vehicle battery, and a power supply circuit for performing power supply from the in-vehicle battery to an outside; and a case including a first housing chamber that houses the rotary electric machine and the power transmission mechanism, and a second housing chamber that houses the inverter module and the power source module, and when a direction along a rotor axis being a rotational axis of the rotor is defined as an axial direction, a direction orthogonal to the rotor axis in an up-down direction view is defined as an axis-orthogonal direction, and one side in the axis-orthogonal direction is defined as an axis-orthogonal direction first side, an output axis being a rotational axis of the output member is arranged coaxially with the rotor axis, the power transmission mechanism includes an offset gear mechanism being arranged on an offset axis being located on the axis-orthogonal direction first side with respect to the rotor axis and the output axis, the second housing chamber includes, while the vehicle drive device is in an in-vehicle state of being mounted on a vehicle, an upper area being an area being located on an upper side with respect to the rotary electric machine and overlapping the rotary electric machine in an up-down direction view, and a lateral area being an area being located on the axis-orthogonal direction first side with respect to the rotary electric machine, not overlapping the rotary electric machine in an up-down direction view, and overlapping the offset gear mechanism in an axial direction view, at least a part of the inverter module is arranged in the upper area, and at least a part of the power source module is arranged in the lateral area.

According to the present configuration, since the power source module and the inverter module being a circuit module drive-controlling the rotary electric machine are housed in one second housing chamber, sharing of a component between, for example, the inverter module and the power source module can be achieved. Thus, reduction in the numbers of components and reduction in weights of the inverter module and the power source module can be easily achieved. In addition, according to the present configuration, the inverter module is arranged in the upper area being located on the upper side with respect to the rotary electric machine in the second housing chamber, and the power source module is arranged in the lateral area being located on the axis-orthogonal direction first side with respect to the rotary electric machine in the second housing chamber. Specifically, miniaturization in the up-down direction of the vehicle drive device can be easily achieved, compared with a configuration in which both the inverter module and the power source module are, for example, arranged in an area located on the upper side of the rotary electric machine. Further, according to the present configuration, the power source module can be arranged by using a space generated on the axis-orthogonal direction first side with respect to the rotary electric machine due to arrangement of the offset gear mechanism. Therefore, it is easy to prevent the vehicle drive device from becoming larger in size due to the vehicle drive device further including the power source module in addition to the rotary electric machine, the output member, the power transmission mechanism, and the inverter module. Specifically, according to the present configuration, the vehicle drive device that houses the rotary electric machine, the output member, the power transmission mechanism that transmits driving force between the rotary electric machine and the output member, the circuit module that drive-controls the rotary electric machine, and the power source module in the same case can be formed smaller in size.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle drive device comprising:

a rotary electric machine including a rotor;

an output member being drivingly connected to a wheel;

a power transmission mechanism that transmits driving force between the rotary electric machine and the output member;

an inverter module for drive-controlling the rotary electric machine;

a power source module that is electrically connected to an in-vehicle battery and includes at least one of a voltage conversion circuit that performs conversion of voltage of the in-vehicle battery, a charging circuit for performing charging from an external power source to the in-vehicle battery, and a power supply circuit for performing power supply from the in-vehicle battery to an outside; and a case including a first housing chamber that houses the rotary electric machine and the power transmission mechanism, and a second housing chamber that houses the inverter module and the power source module, wherein, when a direction along a rotor axis being a rotational axis of the rotor is defined as an axial direction, a direction orthogonal to the rotor axis in an up-down direction view is defined as an axis-orthogonal direction, and one side in the axis-orthogonal direction is defined as an axis-orthogonal direction first side, an output axis being a rotational axis of the output member is arranged coaxially with the rotor axis, the power transmission mechanism includes an offset gear mechanism being arranged on an offset axis being located on the axis-orthogonal direction first side with respect to the rotor axis and the output axis, the second housing chamber includes, while the vehicle drive device is in an in-vehicle state of being mounted on a vehicle, an upper area being an area being located on an upper side with respect to the rotary electric machine and overlapping the rotary electric machine in an up-down direction view, and a lateral area being an area being located on the axis-orthogonal direction first side with respect to the rotary electric machine, not overlapping the rotary electric machine in an up-down direction view, and overlapping the offset gear mechanism in an axial direction view, at least a part of the inverter module is arranged in the upper area, and at least a part of the power source module is arranged in the lateral area.

2. The vehicle drive device according to claim 1, wherein a dimension in an up-down direction of the power source module is larger than a dimension in an up-down direction of the inverter module, and a dimension in the axis-orthogonal direction of the inverter module is larger than a dimension in the axis-orthogonal direction of the power source module.

3. The vehicle drive device according to claim 1, wherein a shared component shared by the inverter module and the power source module is arranged in a connection area in which the upper area and the lateral area are connected.

4. The vehicle drive device according to claim 2, wherein a shared component shared by the inverter module and the power source module is arranged in a connection area in which the upper area and the lateral area are connected.

5. The vehicle drive device according to claim 1, wherein, when one side in the axial direction is defined as an axial direction first side and another side in the axial direction is defined as an axial direction second side, the output member is arranged on the axial direction first side with respect to the rotary electric machine, a dimension in the axial direction of the offset gear mechanism is smaller than a dimension in the axial direction of the rotary electric machine, at least a part of the offset gear mechanism is arranged on the axial direction first side with respect to the rotary electric machine, the lateral area is formed on the axial direction second side with respect to the offset gear mechanism, the second housing chamber further includes an outer side area that continues from the lateral area on the axis-orthogonal direction first side with respect to the lateral area, a target portion being a part of the power source module is arranged in the outer side area, and the target portion is arranged in such a way as to overlap the offset gear mechanism in an axis-orthogonal direction view along the axis-orthogonal direction.

6. The vehicle drive device according to claim 2, wherein, when one side in the axial direction is defined as an axial direction first side and another side in the axial direction is defined as an axial direction second side, the output member is arranged on the axial direction first side with respect to the rotary electric machine, a dimension in the axial direction of the offset gear mechanism is smaller than a dimension in the axial direction of the rotary electric machine, at least a part of the offset gear mechanism is arranged on the axial direction first side with respect to the rotary electric machine, the lateral area is formed on the axial direction second side with respect to the offset gear mechanism, the second housing chamber further includes an outer side area that continues from the lateral area on the axis-orthogonal direction first side with respect to the lateral area, a target portion being a part of the power source module is arranged in the outer side area, and the target portion is arranged in such a way as to overlap the offset gear mechanism in an axis-orthogonal direction view along the axis-orthogonal direction.

* * * * *